United States Patent
Nassar

(10) Patent No.: US 10,572,529 B2
(45) Date of Patent: *Feb. 25, 2020

(54) DATA INTEGRATION TOOL

(71) Applicant: Palantir Technologies Inc., Palo Alto, CA (US)

(72) Inventor: Anthony Albert Nassar, Reston, VA (US)

(73) Assignee: Palantir Technologies Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/974,504

(22) Filed: May 8, 2018

(65) Prior Publication Data

US 2018/0300402 A1    Oct. 18, 2018

Related U.S. Application Data

(63) Continuation of application No. 14/571,006, filed on Dec. 15, 2014, now Pat. No. 9,984,152, which is a
(Continued)

(51) Int. Cl.
*G06F 17/00* (2019.01)
*G06F 17/30* (2006.01)
(Continued)

(52) U.S. Cl.
CPC .......... *G06F 16/367* (2019.01); *G06F 11/362* (2013.01); *G06F 11/3688* (2013.01);
(Continued)

(58) Field of Classification Search
CPC ... H04L 67/02; G06F 8/61; G06F 8/65; G06F 16/2365; G06F 16/213; G06F 16/214;
(Continued)

(56) References Cited

U.S. PATENT DOCUMENTS

| 6,640,231 B1 | 10/2003 | Andersen et al. |
| 7,823,164 B2 | 10/2010 | Gibbs et al. |

(Continued)

FOREIGN PATENT DOCUMENTS

| CA | 2666364 | 1/2015 |
| DE | 102014215621 | 2/2015 |

(Continued)

OTHER PUBLICATIONS

Exchanger XML Editor—XSLT Debugger, Cladonia Ltd., 19 pages (Year: 2005).*

(Continued)

*Primary Examiner* — Thuy Dao
(74) *Attorney, Agent, or Firm* — Sheppard Mullin Richter & Hampton LLP

(57) ABSTRACT

Computer-implemented systems and methods are disclosed for providing proactive validations of transformation scripts. In one implementation, a method is provided that includes associating, with at least one processor, the transformation script with ontology parameters. The method also includes initiating a debugging operation of the transformation script having at least one condition and importing, from a data source, at least one data item for transformation. The method further includes determining, as part of the debugging operation, whether the at least one condition that uses the at least one data item is valid based on the ontology parameters and notifying a user, on a display device, of a result associated with the determination.

12 Claims, 12 Drawing Sheets

Related U.S. Application Data continuation of application No. 14/044,800, filed on Oct. 2, 2013, now Pat. No. 8,930,897.

(60) Provisional application No. 61/801,222, filed on Mar. 15, 2013.

(51) Int. Cl.
| | |
|---|---|
| *G06F 9/44* | (2018.01) |
| *G06F 15/00* | (2006.01) |
| *G06F 16/36* | (2019.01) |
| *G06F 11/36* | (2006.01) |
| *G06F 16/28* | (2019.01) |
| *G06F 16/23* | (2019.01) |

(52) U.S. Cl.
CPC ...... *G06F 11/3692* (2013.01); *G06F 16/2365* (2019.01); *G06F 16/288* (2019.01); *G06F 16/289* (2019.01)

(58) Field of Classification Search
CPC ............ G06F 16/2358; G06F 16/2379; G06F 17/227; G06F 17/2247; G06F 17/2725; G06F 8/315; G06F 17/243; G06F 17/24; G06F 16/367; G06F 16/289; G06F 16/288; G06F 11/362; G06F 11/3688; G06F 11/3692; G06Q 30/0633; G06Q 10/10

See application file for complete search history.

(56) References Cited

U.S. PATENT DOCUMENTS

| | | | | |
|---|---|---|---|---|
| 8,046,683 | B2* | 10/2011 | Larcheveque | G06F 17/24 715/234 |
| 8,078,960 | B2* | 12/2011 | Chalecki | G06F 17/2247 715/234 |
| 8,127,226 | B2* | 2/2012 | Kuznetsov | G06F 17/272 715/239 |
| 8,332,354 | B1 | 12/2012 | Chatterjee et al. | |
| 8,418,085 | B2 | 4/2013 | Snook et al. | |
| 8,489,623 | B2 | 7/2013 | Jain et al. | |
| 8,560,494 | B1 | 10/2013 | Downing | |
| 8,762,831 | B2* | 6/2014 | Fuchs | G06F 17/2258 715/236 |
| 8,769,487 | B2 | 7/2014 | Chandrasekharan | |
| 8,855,999 | B1 | 10/2014 | Elliot | |
| 8,903,717 | B2 | 12/2014 | Elliot | |
| 8,930,897 | B2 | 1/2015 | Nassar | |
| 8,966,441 | B2 | 2/2015 | Cohanoff | |
| 9,003,282 | B2 | 4/2015 | Baer et al. | |
| 9,009,827 | B1 | 4/2015 | Albertson et al. | |
| 9,201,920 | B2 | 12/2015 | Jain et al. | |
| 9,223,773 | B2 | 12/2015 | Isaacson | |
| 9,229,952 | B1 | 1/2016 | Meacham et al. | |
| 9,317,410 | B2 | 4/2016 | Eilam et al. | |
| 9,600,796 | B2* | 3/2017 | Schoning | G06F 16/367 |
| 9,984,152 | B2 | 5/2018 | Nassar | |
| 2003/0074187 | A1 | 4/2003 | Ait-Mokhtar et al. | |
| 2004/0117769 | A1* | 6/2004 | Lauzon | G06F 8/34 717/125 |
| 2004/0221223 | A1 | 11/2004 | Yu et al. | |
| 2004/0260702 | A1 | 12/2004 | Cragun et al. | |
| 2005/0039119 | A1 | 2/2005 | Parks et al. | |
| 2006/0129993 | A1* | 6/2006 | Belisario | G06F 11/362 717/124 |
| 2006/0271838 | A1 | 11/2006 | Carro | |
| 2007/0079236 | A1* | 4/2007 | Schrier | G06F 17/217 715/206 |
| 2007/0233709 | A1 | 10/2007 | Abnous | |
| 2007/0239762 | A1* | 10/2007 | Farahbod | G06F 8/35 |
| 2008/0010539 | A1 | 1/2008 | Roth | |
| 2008/0034327 | A1 | 2/2008 | Cisler et al. | |
| 2008/0148398 | A1 | 6/2008 | Mezack et al. | |
| 2008/0281580 | A1 | 11/2008 | Zabokritski | |
| 2009/0172821 | A1 | 7/2009 | Daira et al. | |
| 2009/0228507 | A1 | 9/2009 | Jain et al. | |
| 2009/0254970 | A1 | 10/2009 | Agarwal et al. | |
| 2010/0257015 | A1 | 10/2010 | Molander | |
| 2010/0257515 | A1 | 10/2010 | Bates et al. | |
| 2010/0313119 | A1 | 12/2010 | Baldwin et al. | |
| 2011/0093774 | A1* | 4/2011 | Davis | G06F 17/227 715/236 |
| 2011/0213791 | A1 | 9/2011 | Jain et al. | |
| 2012/0137235 | A1 | 5/2012 | Ts et al. | |
| 2013/0024268 | A1 | 1/2013 | Manickavelu | |
| 2013/0086482 | A1 | 4/2013 | Parsons | |
| 2013/0225212 | A1 | 8/2013 | Khan | |
| 2013/0246560 | A1 | 9/2013 | Feng et al. | |
| 2013/0251233 | A1 | 9/2013 | Yang et al. | |
| 2014/0019423 | A1 | 1/2014 | Leinsberger et al. | |
| 2014/0047319 | A1 | 2/2014 | Eberlein | |
| 2014/0244388 | A1 | 8/2014 | Manouchehri et al. | |
| 2014/0282409 | A1* | 9/2014 | Nassar | G06F 11/362 717/124 |
| 2015/0007129 | A1 | 1/2015 | William | |
| 2015/0046481 | A1 | 2/2015 | Elliot | |
| 2015/0100559 | A1 | 4/2015 | Nassar | |
| 2015/0142766 | A1 | 5/2015 | Jain et al. | |
| 2015/0261847 | A1 | 9/2015 | Ducott et al. | |

FOREIGN PATENT DOCUMENTS

| | | |
|---|---|---|
| EP | 2221725 | 8/2010 |
| EP | 2911078 | 8/2015 |
| EP | 3018553 | 5/2016 |
| GB | 2366498 | 3/2002 |
| GB | 2518745 | 4/2015 |
| NL | 2013306 | 2/2015 |
| NL | 2011642 | 8/2015 |
| NL | 2012434 | 7/2016 |
| WO | WO 2002/035376 | 5/2002 |

OTHER PUBLICATIONS

Kandel et al., Wrangler: interactive visual specification of data transformation scripts, 10 pages (Year: 2011).*

Anonymous, "BackTult—JD Edwards One World Version Control System," printed Jul. 23, 2007 in 1 page.

Geiger, Jonathan G., "Data Quality Management, The Most Critical Initiative You Can Implement", Data Warehousing, Management and Quality, Paper 098-29, SUGI 29, Intelligent Solutions, Inc., Bounder, CO, pp. 14, accessed Oct. 3, 2013.

Kandel et al., "Wrangler: Interactive Visual Specification of Data Transformation Scripts," May 2011, 10 pages.

Notice of Allowance for U.S. Appl. No. 14/148,568 dated Aug. 26, 2015.

Notice of Allowance for U.S. Appl. No. 14/508,696 dated Jul. 27, 2015.

Notice of Allowance for U.S. Appl. No. 14/533,433 dated Sep. 1, 2015.

Notice of Allowance for U.S. Appl. No. 14/571,006 dated Jan. 8, 2018.

Notice of Allowance for U.S. Appl. No. 14/879,916 dated Jun. 22, 2016.

Official Communiation for U.S. Appl. No. 14/148,568 dated Mar. 26, 2015.

Official Communication for Australian Patent Application No. 2014201506 dated Feb. 27, 2015.

Official Communication for Australian Patent Application No. 2014201511 dated Feb. 27, 2015.

Official Communication for Australian Patent Application No. 2014201507 dated Feb. 27, 2015.

Official Communication for European Patent Application No. 14158958.0 dated Apr. 16, 2015.

Official Communication for European Patent Application No. 14158977.0 dated Mar. 11, 2016.

(56) References Cited

OTHER PUBLICATIONS

Official Communication for European Patent Application No. 14158977.0 dated Apr. 16, 2015.
Official Communication for European Patent Application No. 14158958.0 dated Mar. 11, 2016.
Official Communication for European Patent Application No. 14159464.8 dated Feb. 18, 2016.
Official Communication for European Patent Application No. 14159629.6 dated Jul. 31, 2014.
Official Communication for European Patent Application No. 15155845.9 dated Oct. 6, 2015.
Official Communication for European Patent Application No. 15192965.0 dated Mar. 17, 2016.
Official Communication for Great Britain Patent Application No. 1413935.6 dated Dec. 21, 2015.
Official Communication for Great Britain Patent Application No. 1413935.6 dated Jan. 27, 2015.
Official Communication for Great Britain Patent Application No. 1404479.6 dated Jul. 9, 2015.
Official Communication for Israel Patent Application No. 198253 dated Jan. 12, 2016.
Official Communication for Israel Patent Application No. 198253 dated Nov. 24, 2014.
Official Communication for Netherlands Patent Application No. 2012434 dated Jan. 8, 2016.
Official Communication for Netherlands Patent Application No. 2013306 dated Apr. 24, 2015.
Official Communication for New Zealand Patent Application No. 622513 dated Apr. 3, 2014.
Official Communication for New Zealand Patent Application No. 622389 dated Mar. 20, 2014.
Official Communication for New Zealand Patent Application No. 622497 dated Jun. 19, 2014.
Official Communication for New Zealand Patent Application No. 622497 dated Mar. 26, 2014.
Official Communication for New Zealand Patent Application No. 622404 dated Mar. 20, 2014.
Official Communication for U.S. Appl. No. 13/557,100 dated Apr. 7, 2016.
Official Communication for U.S. Appl. No. 14/025,653 dated Oct. 6, 2015.
Official Communication for U.S. Appl. No. 14/025,653 dated Mar. 3, 2016.
Official Communication for U.S. Appl. No. 14/134,558 dated May 16, 2016.
Official Communication for U.S. Appl. No. 14/134,558 dated Aug. 26, 2016.
Official Communication for U.S. Appl. No. 14/134,558 dated Oct. 7, 2015.
Official Communication for U.S. Appl. No. 14/508,696 dated Mar. 2, 2015.
Official Communication for U.S. Appl. No. 14/526,066 dated Jan. 21, 2016.
Official Communication for U.S. Appl. No. 14/526,066 dated May 6, 2016.
Official Communication for U.S. Appl. No. 14/571,006 dated Sep. 19, 2017.
Official Communication for U.S. Appl. No. 14/571,006 dated May 25, 2017.
Official Communication for U.S. Appl. No. 14/571,006 dated Mar. 3, 2017.
Official Communication for U.S. Appl. No. 14/631,633 dated Feb. 3, 2016.
Official Communication for U.S. Appl. No. 14/879,916 dated Apr. 15, 2016.
Official Communication for U.S. Appl. No. 14/954,680 dated May 12, 2016.
Symantec Corporation, "E-Security Begins with Sound Security Policies," Announcement Symantec, Jun. 14, 2001.
Wollrath et al., "A Distributed Object Model for the Java System," Conference on Object-Oriented Technologies and Systems, Jun. 17-21, 1996, pp. 219-231.

* cited by examiner

```
<?xml version="1.0" encoding="UTF-8"?>
<beans xmlns="http://www.springframework.org/schema/beans"
    xmlns:xsi="http://www.w3.org/2001/XMLSchema-instance" xmlns:lang="http://www.springframework.org/schema/lang"
    xmlns:context="http://www.springframework.org/schema/context"
    xsi:schemaLocation="http://www.springframework.org/schema/beans
        http://www.springframework.org/schema/beans/spring-beans-3.0.xsd
        http://www.springframework.org/schema/context
        http://www.springframework.org/schema/context/spring-context-3.0.xsd
        http://www.springframework.org/schema/lang
    ">
    <!--Directory to output serialized files -->
    <bean id="outputDirectory" class="java.io.File">
        <constructor-arg value="${user.home}/KeaExamplesOutput" />
    </bean>
    <!-- number of directory levels for serialized output -->
    <bean id="directoryLevels" class="java.lang.Integer">
        <constructor-arg value="0" />
    </bean>
    <!-- Ontology file to use -->
    <bean id="ontologyFile" class="java.io.File">
        <constructor-arg value="default.ont" />
    </bean>
</beans>
```

Configuration File 300

Ontology File 310

FIG. 3

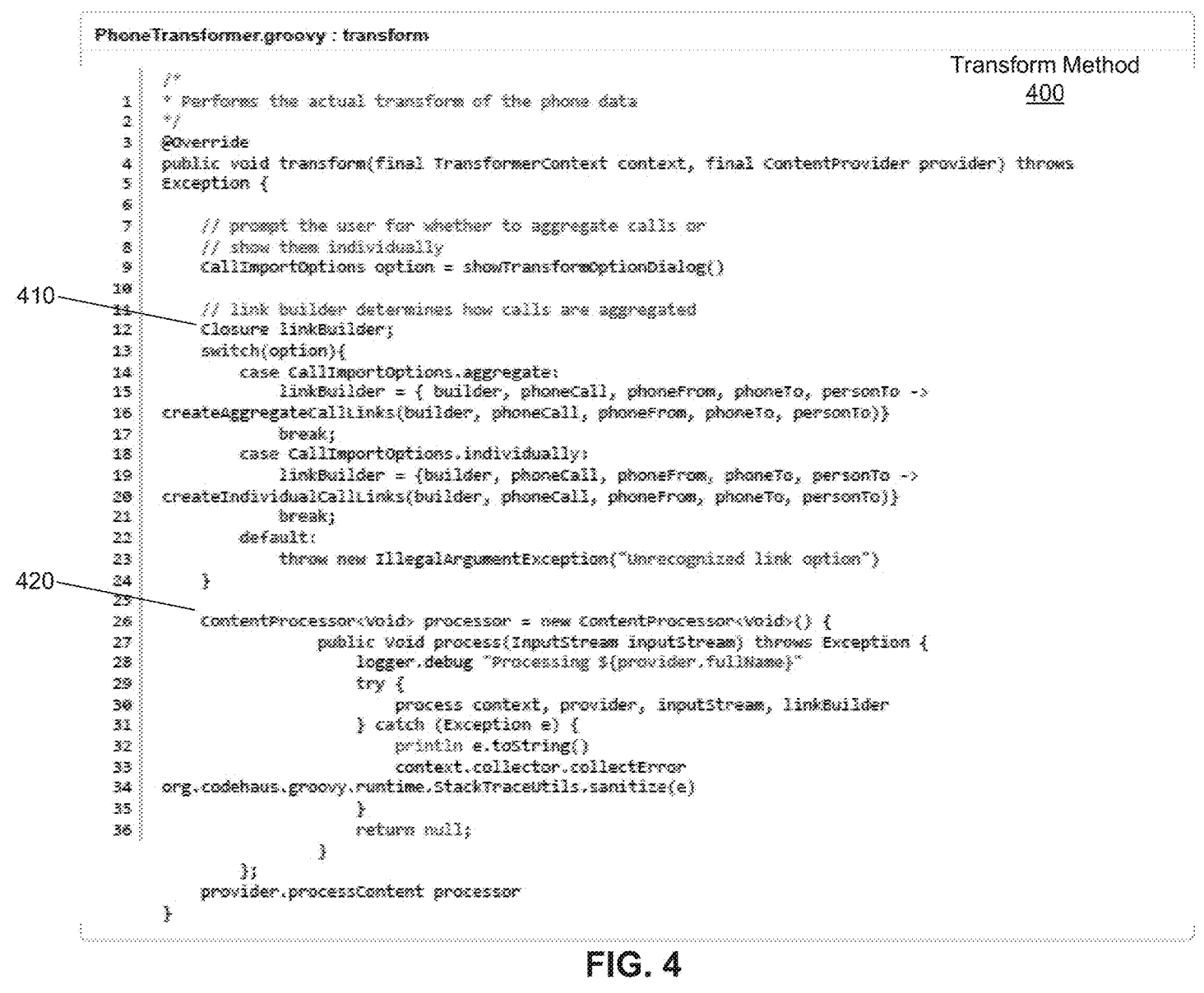

```
PhoneTransformer.groovy : transform
1  /*
2   * performs the actual transform of the phone data
3   */
4  @Override
5  public void transform(final TransformerContext context, final ContentProvider provider) throws
6  Exception {
7
8      // prompt the user for whether to aggregate calls or
9      // show them individually
10     CallImportOptions option = showTransformOptionDialog()
11
12     // link builder determines how calls are aggregated
13     Closure linkBuilder;
14     switch(option){
15         case CallImportOptions.aggregate:
16             linkBuilder = { builder, phoneCall, phoneFrom, phoneTo, personTo ->
17                 createAggregateCallLinks(builder, phoneCall, phoneFrom, phoneTo, personTo)}
18             break;
19         case CallImportOptions.individually:
20             linkBuilder = { builder, phoneCall, phoneFrom, phoneTo, personTo ->
21                 createIndividualCallLinks(builder, phoneCall, phoneFrom, phoneTo, personTo)}
22             break;
23         default:
24             throw new IllegalArgumentException("unrecognized link option")
25     }
26     ContentProcessor<Void> processor = new ContentProcessor<Void>() {
27         public void process(InputStream inputStream) throws Exception {
28             logger.debug "processing ${provider.fullName}"
29             try {
30                 process context, provider, inputStream, linkBuilder
31             } catch (Exception e) {
32                 println e.toString()
33                 context.collector.collectError
34                 org.codehaus.groovy.runtime.StackTraceUtils.sanitize(e)
35             }
36             return null;
37         }
38     };
39     provider.processContent processor
40 }
```

410

420

Transform Method
400

FIG. 4

Link Builder Methods
500

```
 1  /*
 2   * Creates links that will collapse the call events between common endpoints
 3   * onto a single link with a call count property
 4  private static def createAggregateCallLinks(GroovyPalantirBuilder builder, def phone_call,
 5      def phoneFrom, def phoneTo, def personTo){
 6      builder.links{
 7          simple(from:phoneFrom, through:phone_call)
 8          simple(through:phone_call, to:phoneTo)
 9          ownerOf(parent:personTo, child:phoneTo)
10      }
11  }
12
13  /*
14   * create individual call events for each call between endpoints
15   */
16  private static def createIndividualCallLinks(GroovyPalantirBuilder builder, def phone_call,
17      def phoneFrom, def phoneTo, def personTo){
18      builder.links{
19          simple(parent:phoneFrom, child:phone_call)
20          simple(parent:phone_call, child:phoneTo)
21          ownerOf(parent:personTo, child:phoneTo)
22      }
23  }
```

510 — (line 4 callout)
520 — (line 16 callout)

FIG. 5

Process Method
600

```
process
 1  /*
 2   * process the transform
 3   * @param context
 4   * @param provider
 5   * @param inputStream
 6   * @param linkBuilder - how links are built determines if calls are aggregated or shown as individual
 7   events
 8   */
 9  void process(TransformerContext context, ContentProvider provider, InputStream inputStream, Closure
    linkBuilder) throws IOException, MessagingException {
10      //def builder = getBuilder(context);
11      //buildCallLog(builder, provider, shortName, inputStream, context
12
13      // create a reader for the given stream
14      def phoneCallReader = new InputStreamReader(inputStream)
15
16      def phoneCallProvider = new CSVRowTransformer(separator: ';') // provides each row of the CSV as a
17      map ([header_name:value])
18
19      // iterate over the rows of the provider
20      phoneCallProvider.eachRow phoneCallReader, { row ->
21          def builder = createBuilder(context)
22
23          processRow(builder, linkBuilder, row)
24          PalantirPrototype model = builder.createModel()
25          PalantirPrototypeTransformer transformer = new PalantirPrototypeTransformer(context)
26
27          // do the transform into the content
28          transformer.transformAndStore model
29
30      }
31
32  }
33
```

FIG. 6A

Process Method
(continued)
600

```
34   /*
35    * Processes each row with the provided builder
36    * @param builder builder for creating PTX's from row data
37    * @param buildLinks Closure that will create links according to the user preference for aggregation
38    * @param row current row that is being processed
39    */
40   private static def processRow(GroovyPalantirBuilder builder, Closure buildLinks, row){
41       // create a new builder for each row
42       String uniqueKey = UUID.randomUUID().toString()
43
44       builder.with {
45
46           int totalSeconds = ParseUtils.parseDurationToSeconds(row.duration)
47
48           // clean up the numbers so they are in a common format
49           def targetNumber = PhoneNumber.parsePhoneNumber(row.target)
50           def dialedNumber = PhoneNumber.parsePhoneNumber(row.dialed_number)
51
52           PTTimeInterval timeStamp = ParseUtils.parseTimeInterval(row.date, row.time, row.duration)
53           def start = timeStamp.timeStart
54           def end = timeStamp.timeEnd
55
56           // create a phone call event entity
57           def phone_call = phone_call("$targetNumber calls $dialedNumber",
58               id: "phoneCall_$uniqueKey",
59               externalId:"phoneCall_$uniqueKey",
60               startTime:start, endTime:end) {
61
62               id_number row.case_number
63
64               phone_number {
65                   country targetNumber.country
66                   area_code targetNumber.area
67                   local targetNumber.local
68               }
69
70               phone_number {
71                   country dialedNumber.country
72                   area_code dialedNumber.area
73                   local dialedNumber.local
74               }
75
76               address{
77                   city row.dialed_city
78                   state row.dialed_state
79               }
80
81               duration {
82                   duration totalSeconds
83                   units "seconds"
84               }
85           }
86
87           def personTo = createPerson(row.dialed_name, builder, row.dialed_city, row.dialed_state);
88           def phoneFrom = createPhone(targetNumber, builder)
89           def phoneTo = createPhone(dialedNumber, builder)
90
91           // call the buildLinks closure to connect the person entities
92           // to their respective phones and the phones to the call event
93           // from this row
94           buildLinks(builder, phone_call, phoneFrom, phoneTo, personTo)
       }
   }
```

FIG. 6B

Psuedo Transformer

DSL Builder
700

```
1  GroovyPalantirBuilder builder = createBuilder(transformContext)
2  builder.with {
3
4    def entity1 = entity_display_name("label/name for the entity",  // where entity1 is an object in
5      the ontology "person", "phone_call"
6                                            nameProperty:propertyValue){
7      entityProperty{ // where entityProperty is a property in the ontology e.g. "address",
8        "phone_number"
9        metaData1 value1
10       metaData2 value2
11     }
12     ... // other properties
13   }
14
15   def entity2 = entity_display_name("label for this entity",
16                                            nameProperty:propertyValue){
17     entityProperty{
18       metaData1 value3
19       metaData2 value4
20     }
21     ... // other properties
22   }
23
24   // create a link between the entities we created
25   links{
26     linktype parent:entity1.child:event1 // where linkType is the display name of a link in the
27     ontology
28   }
29 }
```

FIG. 7

DATA INTEGRATION TOOL

REFERENCE TO RELATED APPLICATIONS

This application is a continuation of U.S. application Ser. No. 14/571,006, filed Dec. 15, 2014, which is a continuation of U.S. application Ser. No. 14/044,800, filed Oct. 2, 2013, now U.S. Pat. No. 8,930,897, which claims the benefit of priority to U.S. Provisional Patent Application No. 61/801,222, filed on Mar. 15, 2013, the disclosure of each of which is expressly incorporated herein by reference in its entirety.

BACKGROUND

Data is commonly stored in computer-based systems in fixed, rigidly structured data stores. For example, one common type of data store is a "flat" file such as a spreadsheet, plain-text document, or XML document. Another common type of data store is a relational database comprising one or more tables. Other examples of data stores that comprise structured data include, without limitation, files systems, object collections, record collections, arrays, hierarchical trees, linked lists, stacks, and combinations thereof.

Often, the underlying structure of these types of data stores is poorly suited for data analysis. One approach for facilitating a more efficient analysis of data in such data stores is to reorganize that data according to an object model that defines object structures and relationships between the object structures.

To create an object model, data items in underlying data stores, such as table rows or cells, can be mapped to properties of the objects in the model. The semantics, or "meanings," of the various components of the object model are defined by an ontology that categorizes objects, relationships, and/or properties according to various defined types. For example, an ontology might categorize objects as being of one of the following types: person, entity, or event. The ontology can define different properties for each object type, such as names, dates, locations, documents, media, and so forth. Moreover, the ontology can further define relationships (or links) between objects, such as employee, participant, sibling, and so forth.

BRIEF DESCRIPTION OF THE DRAWINGS

Reference will now be made to the accompanying drawings showing example embodiments of the present application, and in which:

FIG. 3 shows an exemplary configuration file for a project, consistent with embodiments of the present disclosure.

FIG. 4 shows an exemplary transform method of a transformation script, consistent with embodiments of the present disclosure.

FIG. 5 shows exemplary link builder methods of the transform method described in FIG. 4, consistent with embodiments of the present disclosure.

FIGS. 6A and 6B show an exemplary content process method of the transform method described in FIG. 4, consistent with embodiments of the present disclosure.

FIG. 7 shows an exemplary domain-specific language (DSL) builder called by the content processor described in FIGS. 6A and 6B, consistent with embodiments of the present disclosure.

DETAILED DESCRIPTION OF EXEMPLARY EMBODIMENTS

Reference will now be made in detail to the embodiments, the examples of which are illustrated in the accompanying drawings. Whenever possible, the same reference numbers will be used throughout the drawings to refer to the same or like parts.

Figure 1A:
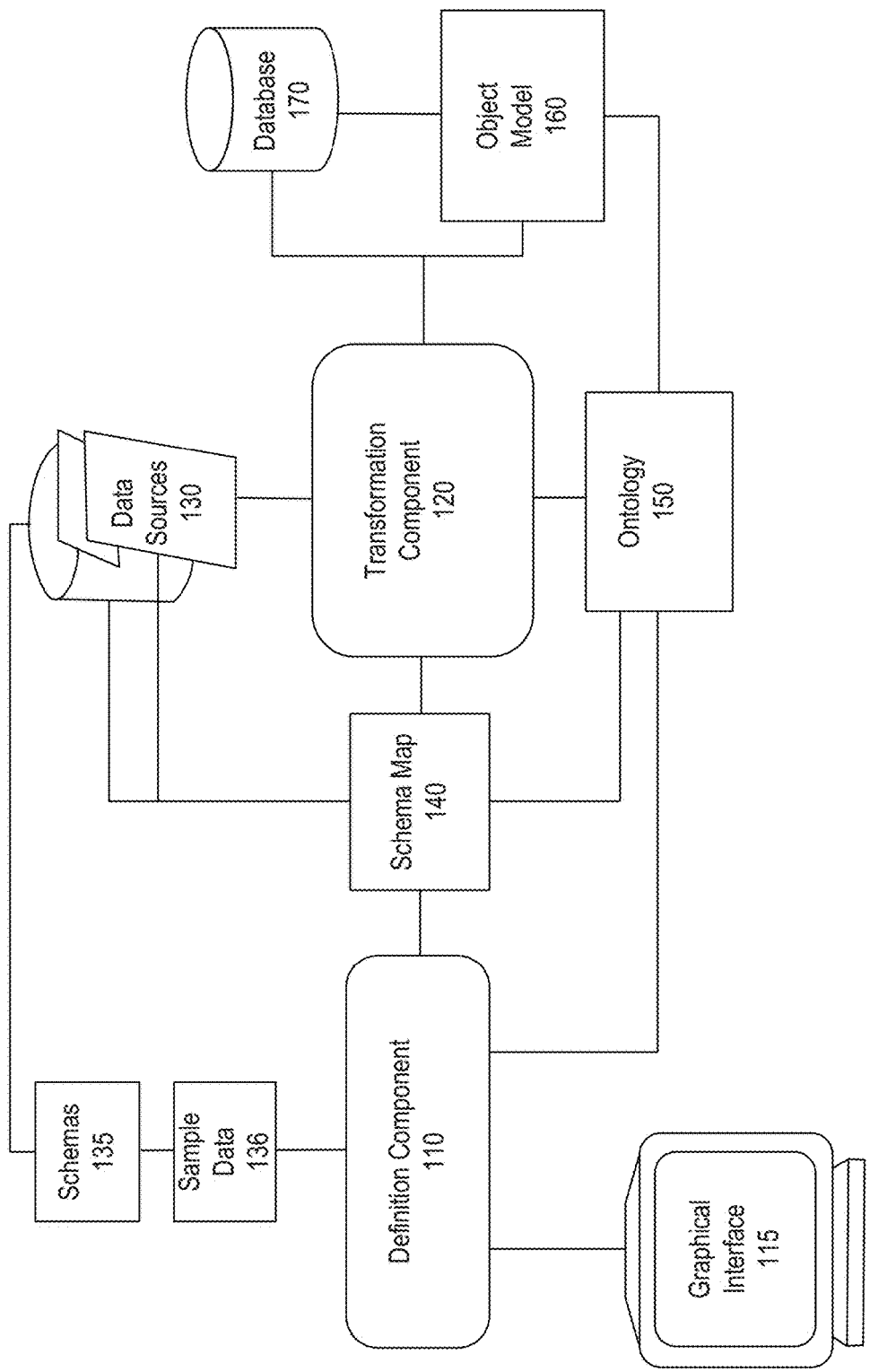
FIG. 1A shows, in block diagram form, an exemplary data fusion system for providing interactive data analysis, consistent with embodiments of the present disclosure.

FIG. 1A shows, in block diagram form, an exemplary data fusion system 100 for providing interactive data analysis, consistent with embodiments of the present disclosure. System 100 can include several components. The components of system 100 can electronically transmit data/information in either direction with other components and can be connected to one another with wired or wireless transmission links and/or via one or more networks.

Among other things, system 100 facilitates transformation of one or more data sources, such as data sources 130, into an object model 160 whose semantics are defined by an ontology 150. The transformation can be performed for a variety of reasons. For example, a database administrator may desire to import data from data sources 130 into a database 170 for persistently storing object model 160. As another example, a data presentation component (not depicted) can transform input data from data sources 130 on the fly into object model 160. The object model 160 can then be utilized, in conjunction with ontology 150, for analysis through graphs and/or other data visualization techniques.

As shown in FIG. 1A, system 100 comprises a definition component 110 and a translation component 120, both implemented by one or more processors on one or more computing devices executing hardware and/or software-based logic for providing various functionality described herein. As will be appreciated from the present disclosure, system 100 can comprise fewer or additional components that provide various functionalities described herein. Such components are, for clarity, omitted from FIG. 1A. Moreover, the component(s) of system 100 responsible for providing various functionalities can further vary from embodiment to embodiment.

Definition component 110 generates and/or modifies ontology 150 and a schema map 140. Exemplary embodiments for defining an ontology (such as ontology 150) are described in U.S. Pat. No. 7,962,495 (the '495 patent), issued Jun. 14, 2011, the entire contents of which are expressly incorporated herein by reference for all purposes. Among other things, the '495 patent describes embodiments that define a dynamic ontology for use in creating data in a database. For creating a database ontology, one or more object types are created where each object type can include one or more properties. The attributes of object types or property types of the ontology can be edited or modified at any time. And for each property type, at least one parser definition is created. The attributes of a parser definition can be edited or modified at any time.

In some embodiments, each property type is declared to be representative of one or more object types. A property type is representative of an object type when the property type is intuitively associated with the object type. For example, a property type of "Social Security Number" may be representative of an object type "Person" but not representative of an object type "Business."

In some embodiments, each property type has one or more components and a base type. In some embodiments, a property type may comprise a string, a date, a number, or a composite type consisting of two or more string, date, or number elements. Thus, property types are extensible and can represent complex data structures. Further, a parser definition can reference a component of a complex property type as a unit or token.

An example of a property having multiple components is a Name property having a Last Name component and a First Name component. An example of raw input data is "Smith, Jane." An example parser definition specifies an association of imported input data to object property components as follows: {LAST_NAME}, {FIRST_NAME}→Name:Last, Name:First. In some embodiments, the association {LAST_NAME}, {FIRST_NAME} is defined in a parser definition using regular expression symbology. The association {LAST_NAME}, {FIRST_NAME} indicates that a last name string followed by a first name string comprises valid input data for a property of type Name. In contrast, input data of "Smith Jane" would not be valid for the specified parser definition, but a user could create a second parser definition that does match input data of "Smith Jane." The definition Name:Last, Name:First specifies that matching input data values map to components named "Last" and "First" of the Name property.

As a result, parsing the input data using the parser definition results in assigning the value "Smith" to the Name:Last component of the Name property, and the value "Jane" to the Name:First component of the Name property.

Referring again to FIG. 1A, schema map 140 can define how various elements of schemas 135 for data sources 130 map to various elements of ontology 150. Definition component 110 receives, calculates, extracts, or otherwise identifies schemas 135 for data sources 130. Schemas 135 define the structure of data sources 130—for example, the names and other characteristics of tables, files, columns, fields, properties, and so forth. Definition component 110 furthermore optionally identifies sample data 136 from data sources 130. Definition component 110 can further identify object type, relationship, and property definitions from ontology 150, if any already exist. Definition component 110 can further identify pre-existing mappings from schema map 140, if such mappings exist.

Figure 1B:
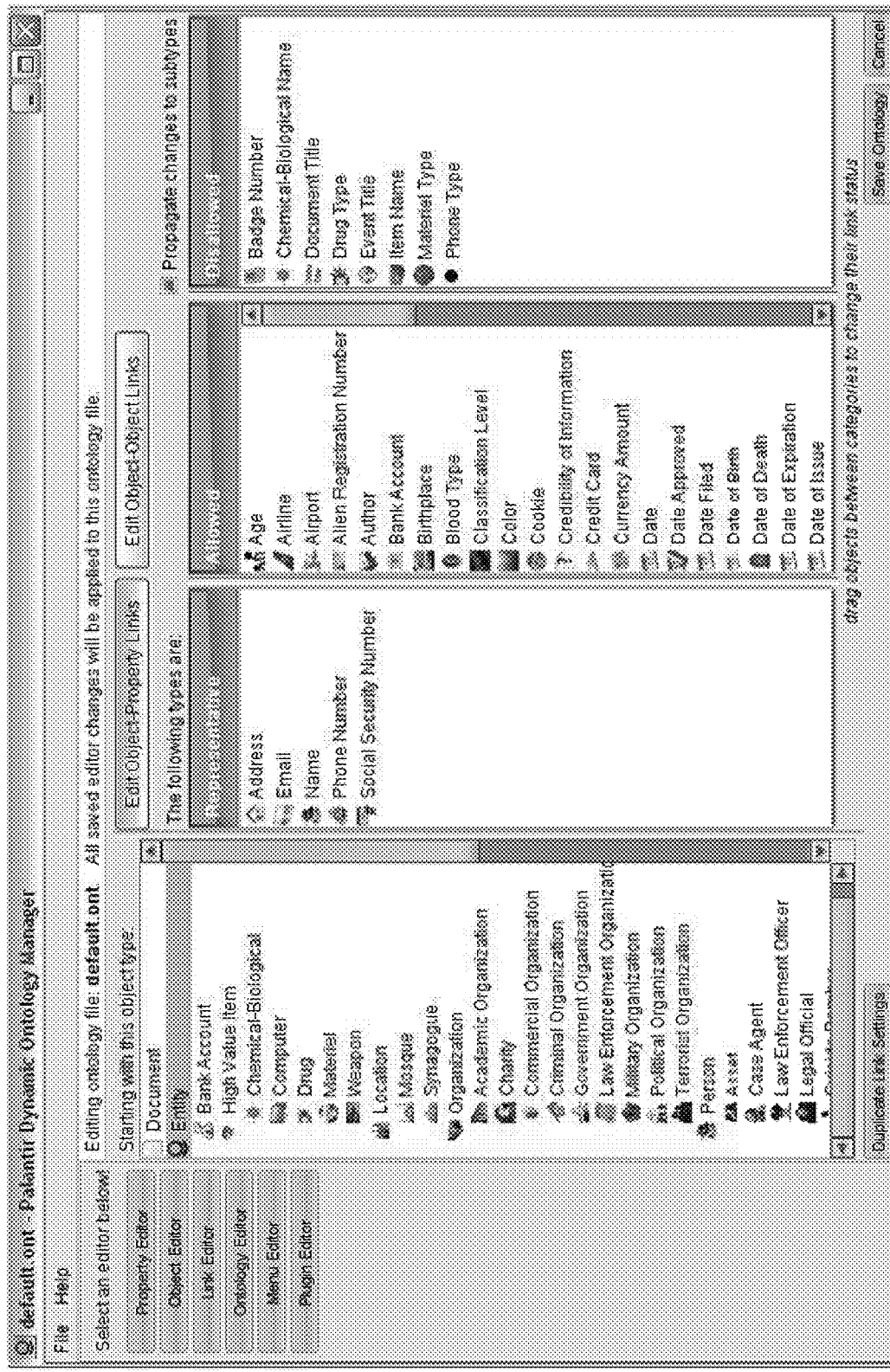
FIG. 1B is a screenshot of an exemplary graphical interface for the data fusion system of FIG. 1A, consistent with embodiments of the present disclosure.

Based on the identified information, definition component 110 can generate a graphical interface 115. Graphical interface 115 can be presented to users of a computing device via any suitable output mechanism (e.g., a display screen, an image projection, etc.), and can further accept input from users of the computing device via any suitable input mechanism (e.g., a keyboard, a mouse, a touch screen interface, etc.). Graphical interface 115 features a visual workspace that visually depicts representations of the elements of ontology 150 for which mappings are defined in schema map 140. FIG. 1B provides an exemplary depiction of graphical interface 115 for visually depicting representations of the elements of ontology 150. Graphical interface 115 also includes controls for adding new elements to schema map 140 and/or ontology 150, including objects, properties of objects, and relationships, via the visual workspace. After elements of ontology 150 are represented in the visual workspace, graphical interface 115 can further provide controls in association with the representations that allow for modifying the elements of ontology 150 and identifying how the elements of ontology 150 correspond to elements of schemas 135. Optionally, the graphical interface 115 can further utilize the sample data 136 to provide the user with a preview of object model 160 as the user defines schema map 140. In response to the input via the various controls of graphical interface 115, definition component 110 can generate and/or modify ontology 150 and schema map 140.

Transformation component 120 can be invoked after schema map 140 and ontology 150 have been defined or redefined. Transformation component 120 identifies schema map 140 and ontology 150. Transformation component 120 further reads data sources 130 and identifies schemas 135 for data sources 130. For each element of ontology 150 described in schema map 140, transformation component 120 iterates through some or all of the data items of data sources 130, generating elements of object model 160 in the manner specified by schema map 140. In some embodiments, transformation component 120 can store a representation of each generated element of object model 160 in a database 170. In some embodiments, transformation component 120 is further configured to synchronize changes in object model 160 back to data sources 130.

Data sources 130 can be one or more sources of data, including, without limitation, spreadsheet files, databases, email folders, document collections, media collections, contact directories, and so forth. Data sources 130 can include data structures stored persistently in non-volatile memory. Data sources 130 can also or instead include temporary data structures generated from underlying data sources via data extraction components, such as a result set returned from a database server executing an database query.

Schema map 140, ontology 150, and schemas 135 can be stored in any suitable structures, such as XML files, database tables, and so forth. In some embodiments, ontology 150 is maintained persistently. Schema map 140 can or cannot be maintained persistently, depending on whether the transformation process is perpetual or a one-time event. Schemas 135 need not be maintained in persistent memory, but can be cached for optimization.

Object model 160 comprises collections of elements such as typed objects, properties, and relationships. The collections can be structured in any suitable manner. In some embodiments, a database 170 stores the elements of object model 160, or representations thereof. In some embodiments, the elements of object model 160 are stored within database 170 in a different underlying format, such as in a series of object, property, and relationship tables in a relational database.

Figure 2:
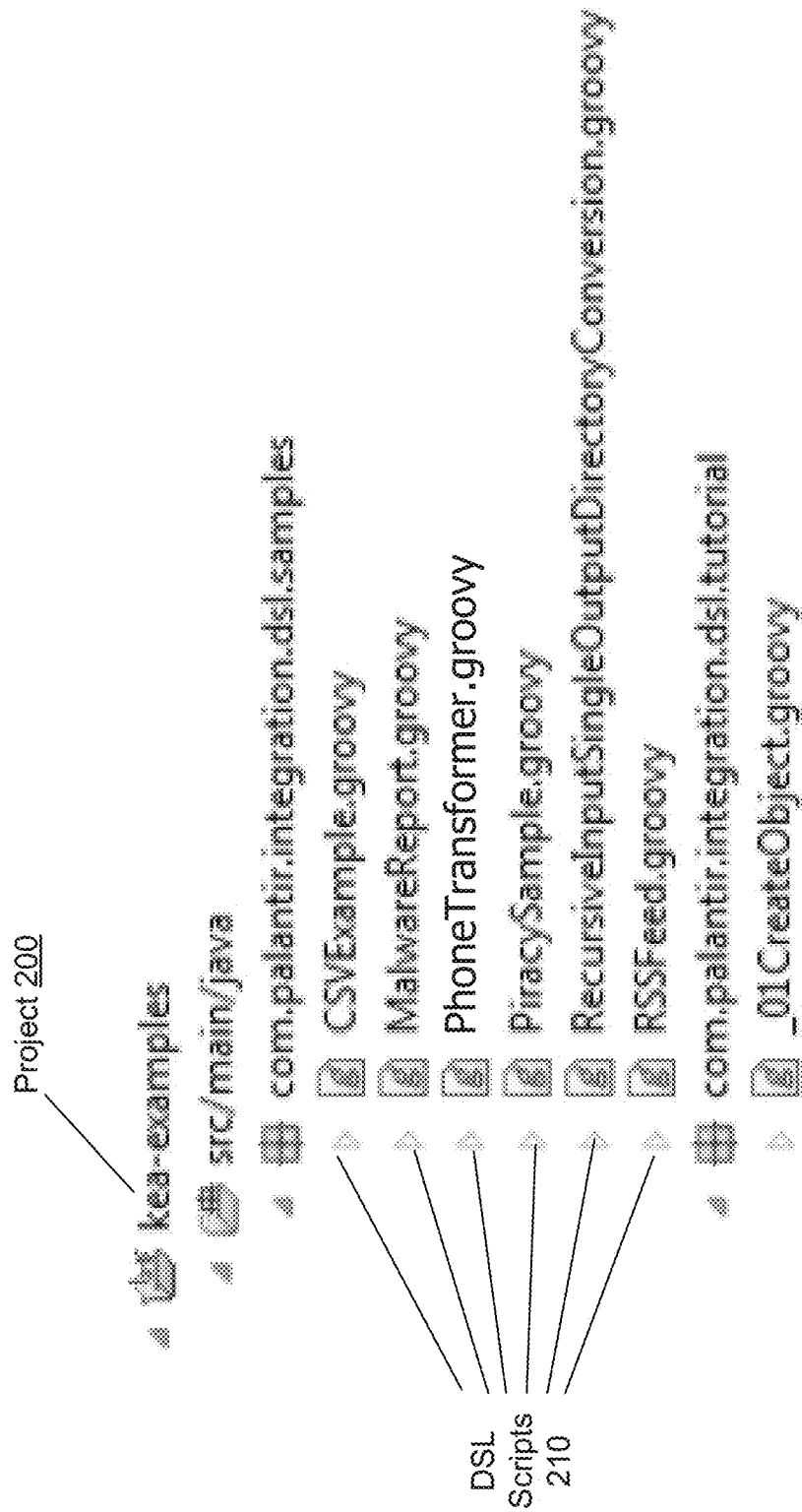
FIG. 2 shows an exemplary project providing one or more transformation scripts associated with data transformation, consistent with embodiments of the present disclosure.

FIG. 2 shows an exemplary project 200 providing one or more scripts 210. Project 200 and its corresponding scripts 210 can be processed by a transformer (such as transformation component 120). Scripts 210 can include one or more transformation scripts associated with transforming some or all data items of data sources 130 into elements for object model 160. In this particular example, project 200 is titled "kea-examples" and has scripts CSVExample.groovy, MalwareReport.groovy, PhoneTransformer.groovy, PiracySample.groovy, RecursiveInputSingleOutputDirectoryConversion.groovy, and RSSFeed.groovy. Project 200 also includes, among other things, a log.properties file for providing instructions for logging outputs and a configuration file for assisting with the running of one or more scripts 210.

FIG. 3 shows an exemplary configuration file 300 for project 200 described above with reference to FIG. 2. Configuration file 300 can be processed by a transformer (such as transformation component 120). Among other things, configuration file 300 can be used for setting parameters while running one or more scripts 210 associated with configuration file 200. Configuration file 300 can identify an ontology file 310 that provides naming and arrangement of objects, properties, and/or links for determining whether proposed outputs from scripts are valid. Ontology file 310 is part of ontology 150 described above. While ontology file 310 is identified in configuration file 200, in some embodiments configuration file 300 points to location where ontology file 310 is located.

Ontology file 310 can have one or more ontology parameters. These ontology parameters assign entities to either an object, property of an entity designated as an object, or a link between objects. For example, an ontology parameter define entity "Organization" as being an object. Additional ontology parameters can define entities "Charity," "Church," and "Academic Organization" as being properties of object "Organization." On the flip side, the entity "Birthplace" would not be a property of "Organization"; thus, there would be no ontology parameter assigning the "Birthplace" property to the "Organization" object.

FIG. 4 shows exemplary transform method 400 of the PhoneTransformer.groovy script identified in project 200 illustrated above in FIG. 2. Transform method 400 includes, among other things, a link builder 410 and a content processor interface 420. Transform method 400 can be processed by a transformer (such as transformation component 120).

In the exemplary embodiment of FIG. 4, transform method 400 includes code for asking a user how to import data (such as calls), by providing two link build options. These options include either (i) aggregating multiple calls between phone number xxx-xxx-xxxx and phone number yyy-yyy-yyyy into a single link or (ii) showing each call between the two numbers as individual link events. In terms of the transformer, a difference between the two options is how links are built. In this example, the building of a link is managed by passing a link building closure (linkBuilder 410) to the link method that processes each row of data.

Exemplary link builder methods 500 are illustrated in FIG. 5 and can be processed by a transformer (such as transformation component 120). Link builder methods 500 include CreateAggregateCallLinks method 510 that creates links collapsing call events between common endpoints into a single link and CreateIndividualCallLinks method 520 that creates links for individual call events for each call between endpoints.

After link builder 410 determines how calls are aggregated, content processor interface 420 can call a process method that performs the transformation of one or more data items from a data sources to elements of an object model. An exemplary process method 600 is shown in FIGS. 6A and 6B and can be processed by a transformer (such as transformation component 120). Process method 600 iterates through data items (such as a row of table), creates a builder, and calls processRow to create an object model having objects and links for the row. When creating a builder, process method 600 can leverage a domain-specific language (DSL) builder 700 shown in the exemplary builder of FIG. 7. DSL builder 700 can be processed by a transformer, such as transformation component 120.

DSL builder 700 is an exemplary builder that includes multiple entities: entity1 710 and entity2 720. Entity1 710 and entity2 720 are built using data items in order to create objects in the ontology "person" and "phone call" defined in ontology file 310 (referred to above in FIG. 3). Moreover, both entity1 710 and entity2 720 include their corresponding properties 715, 725, which also should be defined in ontology file 310.

For example, DSL builder 700 could receive the following data items for building objects entity1 710 and entity2 720 and their corresponding properties 715, 725:

| Name | Address | Phone Number | SSN# |
|---|---|---|---|
| Tom Smith | 123 Grant Avenue | 123-456-7890 | 999-88-7777 |
| David Bruce | 345 Lincoln Street | 987-654-3210 | 111-22-3333 |

DSL builder 700, using the first data item, could build a person object such as "Tom Smith." The properties further defining object "Tom Smith" could include first_name value "Tom," last_name value "Smith," address value "123 Grant Avenue, New York, N.Y." phone_number value "123-456-7890," and SSN value "999-88-7777." Moreover, address can be further defined as street_number value "123," street value "Grant Avenue," city value "New York," and state value "NY."

In some embodiments, DSL builder 700 can be created using a dynamic language, such as Groovy. While Groovy supports the internal (or embedded) DSL used for DSL builder 700, other dynamic languages, such as Python and Ruby, can also support the embedded DSL. These dynamic languages allow an object method to be called without that object method being defined, and the object can determine how to handle the method call. In other words, DSL builder 700 allows for a shorthand notation (e.g., "name") that can expand out to a proper notation (e.g., "object.name"). If, however, the shorthand notation is misspelled (e.g., "namme") in the DSL builder 700 or if the shorthand notation does not correspond with an ontology parameter in ontology file (e.g., property type identified in the DSL builder 700 is not defined or allowed in ontology file), a validation error (further addressed below) would occur during the debugging phase.

Figure 8:
FIG. 8 shows an exemplary software development environment for debugging a transformation script, consistent with embodiments of the present disclosure.

FIG. 8 illustrates an exemplary embodiment of a software development environment 800 used for debugging a transformation script. Before debugging the transformation script, such as the PhoneTransformer script described above with reference to FIG. 2, project 200 should be loaded into software development environment 800. The debug configurations for PhoneTransformer script can allow for the use of core helper functions, such as serialize( ) function and createBuilder( ) function (e.g., DSL builder 700).

Using a DSL builder (such as a Groovy Builder) can provide the ability to create a proactive debugging experience. Proactive debugging provides validation notifications as they arise during the debugging process, as opposed to providing a series of error notifications after the transformation script (which has transformed most, if not all, data items of identified input data into elements of an object model) has been executed. By providing a proactive debugging, a user or developer can then fix the problem that caused the error notification and begin debugging the script again.

One advantage over previous large-scale data integration models is that the embodiments of the present disclosure can avoid having to parse and transform large amounts of data, which can take, for example, four to six hours before the user finds out whether there are any error notifications and, if so, the types of error notifications. After fixing any errors, the user would then have to go through the same process of parsing and transforming the imported input data, which can take another four to six hours before the user finds out whether there are any error notifications during the second round. Such conventional debugging can occur for several rounds before the script is successfully debugged.

The embodiments described herein can overcome the inefficiencies of conventional debugging of transformation scripts by providing proactive debugging of the transformation script. As stated above, proactive debugging displays error notifications as they occur. For example, if an error occurs based on row 1 of an imported table, an expressed result, such as a displayed notification, could then be displayed to the user after that validation issue is detected at row 1. This allows the user to correct the error associated with the first row of the imported table without having to go through the entire imported table, which could include hundreds of thousands of rows, if not more.

In some embodiments, a software development environment is not needed for debugging a script. For example, the debugging can occur by running the script over a command line.

Figure 9:
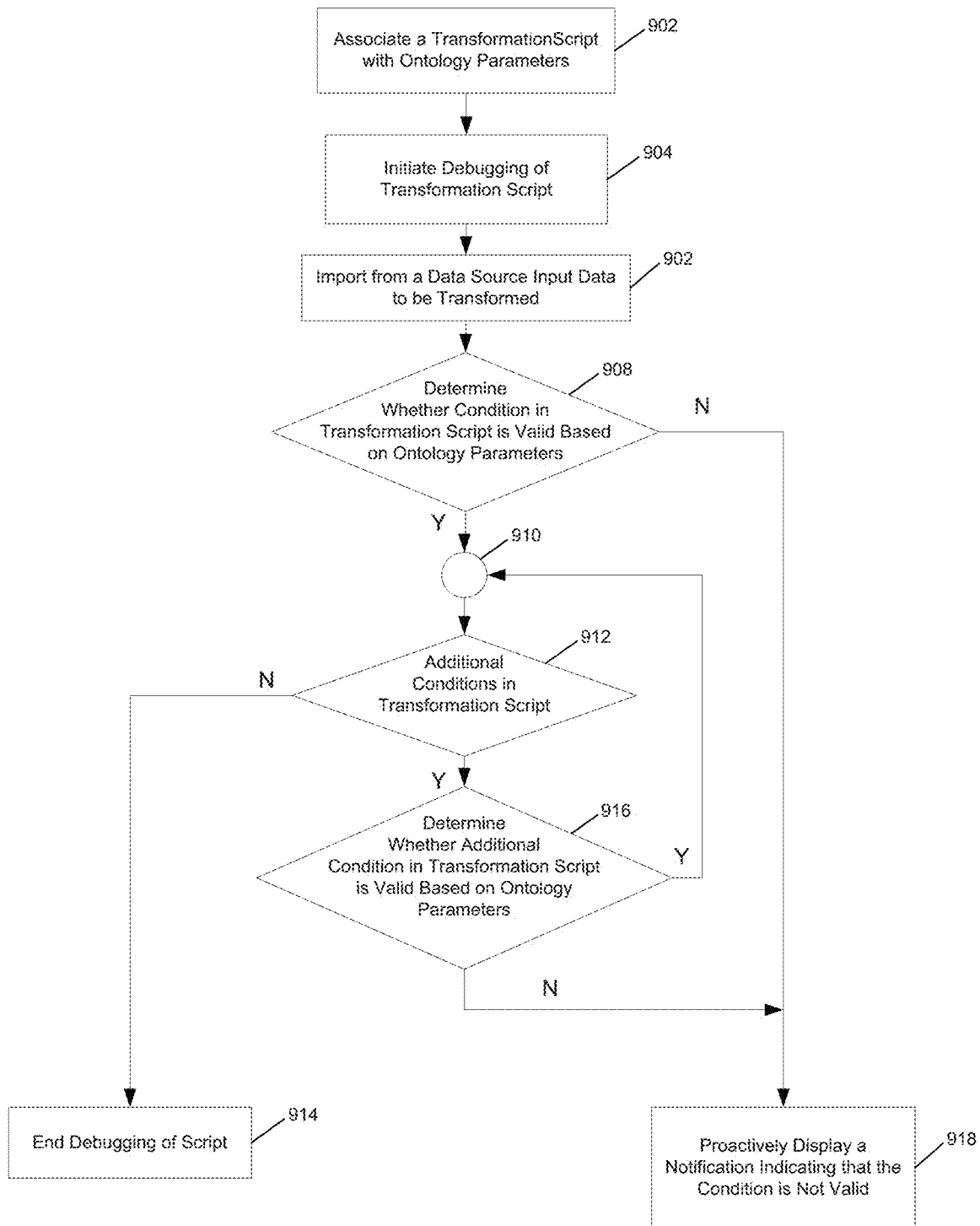
FIG. 9 is a flowchart representing an exemplary method for proactive validation of a transformation script, consistent with embodiments of the present disclosure.

FIG. 9 is a flowchart representing an exemplary method for proactive validation of a transformation script. The transformation script provides functionality for transforming large amounts of data items of data sources into elements of an object model. While the flowchart discloses the following steps in a particular order, it is appreciated that at least some of the steps can be moved, modified, or deleted where appropriate.

In step 902, a transformation script is associated with one or more ontology parameters. In some embodiments, the association can occur by linking the transformation script to a configuration file identifying an ontology file (e.g., ontology file 310) having one or more ontology parameters. In some other embodiments, the association can occur by having the ontology file located in the same directory as the transformation script. For example, as shown above in the exemplary embodiments of FIGS. 2 and 3, transformation scripts 210 of project 200 correspond to ontology file 310 identified in configuration file 300 of project 200. In some other embodiments, the association occurs when the ontology file is called during the debugging of transformation script (referenced below in step 904). The ontology parameters identified in ontology file 310 could then be applied, where appropriate, to conditions in transformation scripts 210.

In step 904, debugging of transformation script is initiated. The debugging can be initiated by a number of means. For example, the debugging can be initiated via a software development environment, such as software development environment 800 described above with reference to FIG. 8. The debugging can also be initiated via command line.

In step 906, input data to be transformed is imported from a data source. This input data can be from one or more data sources. The input data can be structured data (such as tables having rows and columns or a comma-separated value (CSV) files) or can be unstructured data (such as documents, emails, PDF, PowerPoint, and HTML files). For example, the input data can include tables having hundreds of thousands of rows to be transformed.

In step 908, a determination is made whether a condition in transformation script is valid based on the ontology parameters. Transformation script can include one or more conditions. For example, a builder (such as DSL builder 700) can define an entity as an object (e.g., entity1 710), a property of that object (e.g., entityProperty 715), and any links (e.g., link 730). Any definitions in the builder can then be compared to one or more ontology parameters in ontology file (e.g., ontology file 310). Referring back to the "Organization" ontology above, if the builder defines an "Organization" entity as being an object, the condition (defining "Organization" entity as being an object) in the builder will be determined to be valid. Moreover, if the builder defines a "Charity" entity as being a property of the "Organization" entity, the condition (defining "Organization" entity as being an object) in the builder will be determined to be valid. On the other hand, if the builder defines "Birthplace" as being a property of the "Organization" object, the condition will be invalid. Moreover, if the builder incorrectly defines an "Association" object—instead of the correct "Organization" object—this condition will also fail because there would be no "Association" object ontology parameter.

If it is determined that the condition is not valid, at step 918, a notification indicating that the condition is not valid can be proactively displayed. That is, the notification can be displayed shortly after it is determined that the condition is not valid. For example, the notification could be displayed almost instantaneously, seconds, or minutes after the determination. As stated above, proactive debugging, which provides the proactive displaying of appropriate invalidation notifications as they arise, provides an advantage of saving a user's time when debugging the code because it avoids having to parse and transform large amounts of data. In some embodiments, an expressed result is provided if the condition is determined to be not valid. The expressed result can be the proactive displaying of the notification in the debugger, an email or popup window showing that the condition is not valid, or any other way for indicating that the condition is not valid. Moreover, the expressed result can show that the condition is not valid by displaying an error message, an acronym, a number, graphic, and/or any other indication showing that condition is not valid.

If, on the other hand, the condition is determined to be valid, the method proceeds through connector 910 to determine (912) if there are additional conditions in the transformation script. In some embodiments, an expressed result can be provided, indicating that the condition is valid. The expressed result can be a displayed notification in the debugger, an email or popup window showing that the condition is valid, and/or any other way for indicating that the condition is valid. As indicated above, the expressed result can show that the condition is valid by displaying a validation message, an acronym, a number, graphic, and/or any other indication showing that condition is valid. In some embodiments, an implicit result can be provided. The implicit result can include recording the result of the valid condition to a file, a storage location, an email, and/or not displaying that the condition is valid. If the results are recorded, the recorded results can show a validation message, an acronym, a number, graphic, and/or any other indication showing that condition is valid. If there are no additional conditions in the transformation script, then the debugging of script ends (914). In some embodiments, an expressed result can be provided, indicating that the transformation script is valid.

On the other hand, if there are additional conditions in the transformation script, at step 916, a determination is made whether an additional condition in transformation script is valid based on the ontology parameters. Determination step 916 is similar to determination step 908. If the condition is determined to be invalid, an expressed result can be provided, such as in this exemplary embodiment a notification indicating that the condition is proactively displayed. As indicated above, the expressed result can show that the condition is not valid by displaying an error message, an acronym, a number, graphic, and/or any other indication showing that condition is not valid.

On the other hand, if the condition is determined to be valid, the method proceeds through connector 910 to determination step 912. In some embodiments, an expressed result can be provided, indicating that the condition is valid. The expressed result can be a displayed notification in the debugger, an email or popup window showing that the condition is valid, and/or any other way for indicating that the condition is valid. The expressed result can show that the condition is valid by displaying a validation message, an acronym, a number, graphic, and/or any other indication showing that condition is valid. Moreover, in some embodiments an implicit result can be provided. The implicit result can include recording the result of the valid condition to a file, a storage location, an email, and/or not displaying that the condition is valid. If the results are recorded, the recorded results can show a validation message, an acronym, a number, graphic, and/or any other indication showing that condition is valid.

According to some embodiments, the operations, techniques, and/or components described herein are implemented by one or more special-purpose computing devices. The special-purpose computing devices can be hard-wired to perform the operations, techniques, and/or components described herein, or can include digital electronic devices such as one or more application-specific integrated circuits (ASICs) or field programmable gate arrays (FPGAs) that are persistently programmed to perform the operations, techniques, and/or components described herein, or can include one or more general purpose hardware processors programmed to perform such features of the present disclosure pursuant to program instructions in firmware, memory, other storage, or a combination. Such special-purpose computing devices can also combine custom hard-wired logic, ASICs, or FPGAs with custom programming to accomplish the techniques and other features of the present disclosure. The special-purpose computing devices can be desktop computer systems, portable computer systems, handheld devices, networking devices, or any other device that incorporates hard-wired and/or program logic to implement the techniques and other features of the present disclosure.

The one or more computing devices can be generally controlled and coordinated by operating system software, such as iOS, Android, Blackberry, Chrome OS, Windows XP, Windows Vista, Windows 7, Windows 8, Windows Server, Windows CE, Unix, Linux, SunOS, Solaris, VxWorks, or other compatible operating systems. In other embodiments, the computing device can be controlled by a proprietary operating system. Conventional operating systems may control and schedule computer processes for execution, perform memory management, provide file system, networking, I/O services, and/or provide a user interface functionality, such as a graphical user interface ("GUI"), among other things.

Figure 10:
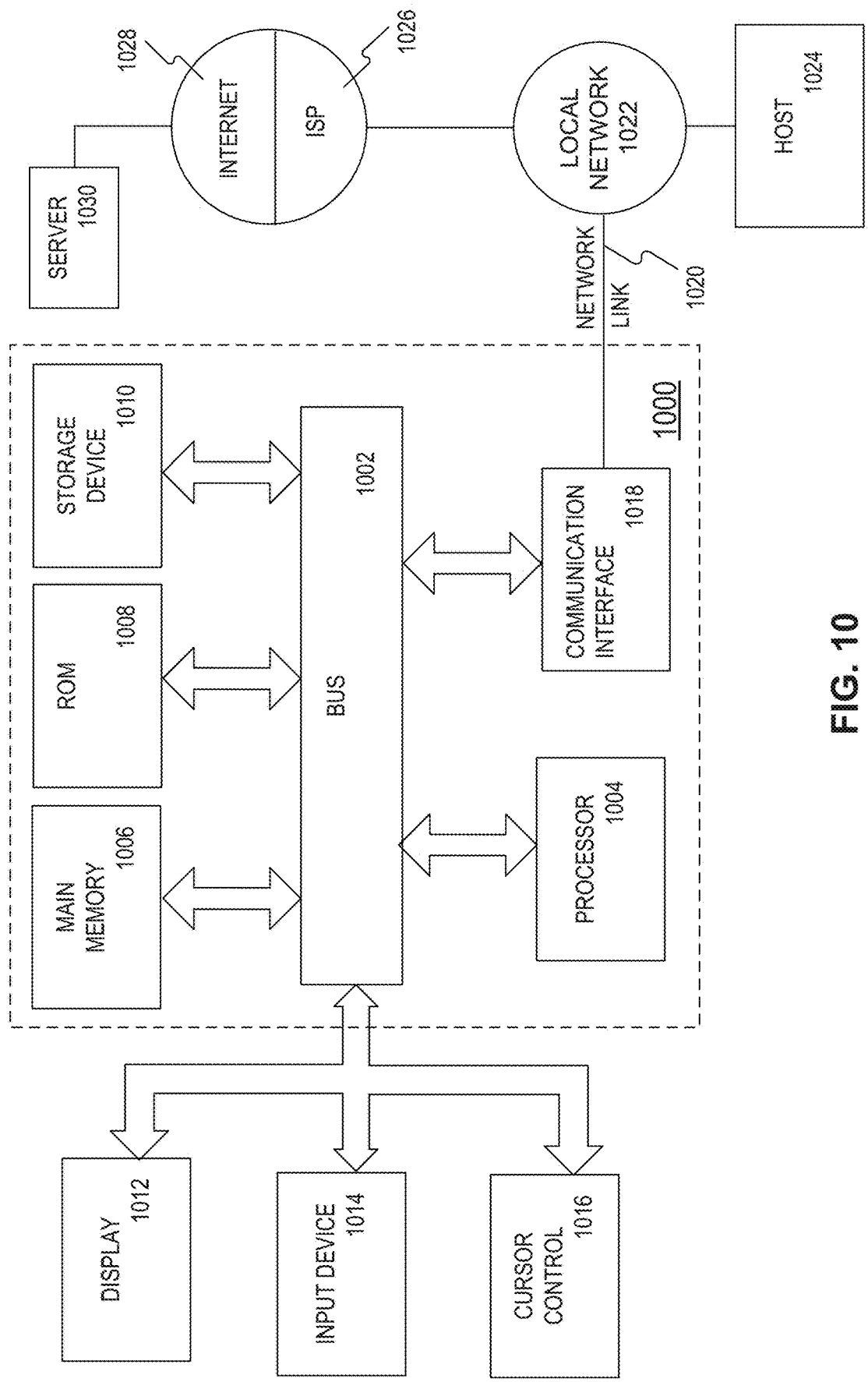
FIG. 10 shows, in block diagram form, an exemplary computer system with which embodiments described herein can be implemented, consistent with embodiments of the present disclosure.

By way of example, FIG. 10 is a block diagram that illustrates an exemplary computer system 1000. Computer system 1000 includes a bus 1002 or other communication mechanism for communicating information, and one or more hardware processors 1004 coupled with bus 1002 for processing information. One or more hardware processors 1004 can be, for example, one or more general purpose microprocessors.

Computer system 1000 also includes a main memory 1006, such as a random access memory (RAM) or other dynamic storage device, coupled to bus 1002 for storing information and instructions to be executed by one or more processors 1004. Main memory 1006 also can be used for storing temporary variables or other intermediate information during execution of instructions to be executed by one or more processors 1004. Such instructions, when stored in non-transitory storage media accessible to one or more processors 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for one or more processors 1004. A storage device 1010, such as a magnetic disk, optical disk or USB thumb drive (Flash drive) etc., is provided and coupled to bus 1002 for storing information and instructions.

Computer system 1000 can be coupled via bus 1002 to a display 1012, such as a cathode ray tube (CRT), for displaying information to a computer user. An input device 1014, including alphanumeric and other keys, is coupled to bus 1002 for communicating information and command selections to one or more processors 1004. Another type of user input device is cursor control 1016, such as a mouse, a trackball, or cursor direction keys for communicating direction information and command selections to one or more processors 1004 and for controlling cursor movement on display 1012. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computer system 1000 can include a user interface module to implement a GUI that may be stored in a mass storage device as executable software codes that are executed by the one or more computing devices. This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "module," as used herein, refers to logic embodied in hardware or firmware, or to a collection of software instructions, possibly having entry and exit points, written in a programming language, such as, for example, Java, Lua, C or C++. A software module can be compiled and linked into an executable program, installed in a dynamic link library, or written in an interpreted programming language such as, for example, BASIC, Perl, or Python. It will be appreciated that software modules can be callable from other modules or from themselves, and/or can be invoked in response to detected events or interrupts. Software modules configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware modules can be comprised of connected logic units, such as gates and flip-flops, and/or can be comprised of programmable units, such as programmable gate arrays or processors. The modules or computing device functionality described herein are preferably implemented as software modules, but can be represented in hardware or firmware. Generally, the modules described herein refer to logical modules that may be combined with other modules or divided into sub-modules despite their physical organization or storage.

Computer system 1000 can implement the techniques and other features described herein using customized hard-wired logic, one or more ASICs or FPGAs, firmware and/or program logic which in combination with the computer system causes or programs computer system 1000 to be a special-purpose machine. According to some embodiments, the techniques and other features described herein are performed by computer system 1000 in response to one or more processors 1004 executing one or more sequences of one or more instructions contained in main memory 1006. Such instructions can be read into main memory 1006 from another storage medium, such as storage device 1010. Execution of the sequences of instructions contained in main memory 1006 causes one or more processors 1004 to perform the process steps described herein. In alternative embodiments, hard-wired circuitry can be used in place of or in combination with software instructions.

The term "non-transitory media" as used herein refers to any media storing data and/or instructions that cause a machine to operate in a specific fashion. Such non-transitory media can comprise non-volatile media and/or volatile media. Non-volatile media includes, for example, optical or magnetic disks, such as storage device 1010. Volatile media includes dynamic memory, such as main memory 1006. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media can be involved in carrying one or more sequences of one or more instructions to processor 1004 for execution. For example, the instructions can initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which one or more processors 1004 retrieve and execute the instructions. The instructions received by main memory 1006 can optionally be stored on storage device 1010 either before or after execution by one or more processors 1004.

Computer system 1000 also includes a communication interface 1018 coupled to bus 1002. Communication interface 1018 provides a two-way data communication coupling to a network link 1020 that is connected to a local network 1022. For example, communication interface 1018 can be an integrated services digital network (ISDN) card, cable modem, satellite modem, or a modem to provide a data communication connection to a corresponding type of telephone line. As another example, communication interface 1018 can be a local area network (LAN) card to provide a data communication connection to a compatible LAN. Wireless links can also be implemented. In any such implementation, communication interface 1018 sends and receives electrical, electromagnetic, or optical signals that carry digital data streams representing various types of information.

Network link 1020 typically provides data communication through one or more networks to other data devices. For example, network link 1020 can provide a connection through local network 1022 to a host computer 1024 or to data equipment operated by an Internet Service Provider (ISP) 1026. ISP 1026 in turn provides data communication services through the world wide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018.

The received code can be executed by one or more processors 1004 as it is received, and/or stored in storage device 1010, or other non-volatile storage for later execution.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the embodiments disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different or modified order, as needed.

What is claimed:

1. A system for providing a proactive validation of a transformation script, the system comprising:
one or more processors; and
memory storing instructions that, when executed by the one or more processors, cause the system to:
initiate a debugging operation of the transformation script having at least one condition wherein the transformation script uses a builder that defines the definition of the entity as the entity being an object or a property of an object;
import, from a data source, at least one data item for transformation;
determine, as part of the debugging operation, the at least one condition that uses the at least one data item is invalid, wherein the at least one condition is determined invalid based on an assignment of an entity associated with the transformation script and a definition of the entity;
associate the transformation script with ontology parameters, the determination the at least one condition that uses the at least one data item is invalid being based on the ontology parameters, wherein the ontology parameters include parameters that assign the entity as being an object or a property of an object, wherein the transformation script includes information for mapping at least a portion of the at least one data item to at least one of the ontology parameters; and
provide an indication of a result associated with the determination, wherein the result is at least one of an implicit result or an expressed result.

2. The system of claim 1, wherein providing the indication of the result comprises any of displaying an error message, an acronym, a number, or a graphic.

3. The system of claim 1, wherein the indication of the result is provided in any of a notification in a debugger application, an email, or a popup window.

4. The system of claim 1, wherein the at least one condition is based on the data source.

5. A method for providing a proactive validation of a transformation script, the method being performed by one or more processors and comprising:
initiating a debugging operation of the transformation script having at least one condition wherein the transformation script uses a builder that defines the definition of the entity as the entity being an object or a property of an object;
importing, from a data source, at least one data item for transformation;
determining, as part of the debugging operation, the at least one condition that uses the at least one data item is invalid, wherein the at least one condition is determined invalid based on an assignment of an entity associated with the transformation script and a definition of the entity;
associating the transformation script with ontology parameters, the determination the at least one condition that uses the at least one data item is invalid being based on the ontology parameters, wherein the ontology parameters include parameters that assign the entity as being an object or a property of an object, wherein the transformation script includes information for mapping at least a portion of the at least one data item to at least one of the ontology parameters; and
providing an indication of a result associated with the determination wherein the result is at least one of an implicit result or an expressed result.

6. The method of claim 5, wherein providing the indication of the result comprises any of displaying an error message, an acronym, a number, or a graphic.

7. The method of claim 5, wherein the indication of the result is provided in any of a notification in a debugger application, an email, or a popup window.

8. The method of claim 5, wherein the at least one condition is based on the data source.

9. The method of claim 5, wherein the data source includes unstructured data or the data source includes structured data.

10. A non-transitory computer readable medium that stores instructions that are executable by at least one processor to cause the at least one processor to perform a method for providing a proactive validation of a transformation script, the method comprising:
initiating a debugging operation of the transformation script having at least one condition wherein the transformation script uses a builder that defines the definition of the entity as the entity being an object or a property of an object;
importing, from a data source, at least one data item for transformation;
determining, as part of the debugging operation, the at least one condition that uses the at least one data item is invalid, wherein the at least one condition is determined invalid based on an assignment of an entity associated with the transformation script and a definition of the entity;
associating the transformation script with ontology parameters, the determination the at least one condition that uses the at least one data item is invalid being based on the ontology parameters, wherein the ontology parameters include parameters that assign the entity as being an object or a property of an object, wherein the transformation script includes information for mapping at least a portion of the at least one data item to at least one of the ontology parameters; and
providing an indication of a result associated with the determination wherein the result is at least one of an implicit result or an expressed result.

11. The non-transitory computer readable medium of claim 10, wherein providing the indication of the result comprises any of displaying an error message, an acronym, a number, or a graphic.

12. The non-transitory computer readable medium of claim 10, wherein the indication of the result is provided in any of a notification in a debugger application, an email, or a popup window.

* * * * *